(12) United States Patent
Wehner et al.

(10) Patent No.: US 7,576,458 B2
(45) Date of Patent: Aug. 18, 2009

(54) DIPPING VARNISH-COATED COOLING SHELL OF A HOUSING FOR AN ELECTRIC MACHINE

(75) Inventors: Hans-Jürgen Wehner, Igensdorf (DE); Günter Sonnauer, Nümberg (DE)

(73) Assignee: Baumuller Nurnberg GmbH, Nuremberg (DE)

( * ) Notice: Subject to any disclaimer, the term of this patent is extended or adjusted under 35 U.S.C. 154(b) by 390 days.

(21) Appl. No.: 10/531,131

(22) PCT Filed: Oct. 20, 2003

(86) PCT No.: PCT/EP03/11590

§ 371 (c)(1),
(2), (4) Date: Nov. 7, 2005

(87) PCT Pub. No.: WO2004/036719

PCT Pub. Date: Apr. 29, 2004

(65) Prior Publication Data

US 2006/0125333 A1     Jun. 15, 2006

(30) Foreign Application Priority Data

Oct. 18, 2002     (DE) .............................. 202 16 113 U

(51) Int. Cl.
*H02K 9/00*     (2006.01)
*H02K 9/20*     (2006.01)
(52) U.S. Cl. .............................. 310/54; 310/52; 310/58; 310/59
(58) Field of Classification Search .................. 310/52, 310/87, 89, 54, 58, 59; *H02K 9/00, 9/20*
See application file for complete search history.

(56) References Cited

U.S. PATENT DOCUMENTS

| 3,371,613 | A | * | 3/1968 | Dahlgren | 417/368 |
| 3,819,965 | A | * | 6/1974 | Schoendube | 310/58 |
| 4,406,959 | A | * | 9/1983 | Harano et al. | 340/58 |
| 4,534,686 | A | * | 8/1985 | Nakamura et al. | 409/135 |
| 4,691,131 | A | * | 9/1987 | Nakano | 310/54 |
| 4,745,314 | A | * | 5/1988 | Nakano | 310/57 |
| 5,084,642 | A | * | 1/1992 | Katsuzawa et al. | 310/54 |
| 5,229,673 | A | * | 7/1993 | Katsuzawa et al. | 310/64 |
| 5,448,118 | A | * | 9/1995 | Nakamura et al. | 310/54 |
| 5,616,973 | A | * | 4/1997 | Khazanov et al. | 310/54 |
| 5,998,896 | A | * | 12/1999 | Early et al. | 310/89 |
| 6,008,314 | A | * | 12/1999 | Collong et al. | 528/123 |

(Continued)

FOREIGN PATENT DOCUMENTS

| JP | 57193952 A | 11/1982 |
| JP | 62236337 A | 10/1987 |
| JP | 03-283481 | 4/1993 |
| JP | 06-270547 | 4/1996 |

(Continued)

*Primary Examiner*—Quyen Leung
*Assistant Examiner*—John K Kim
(74) *Attorney, Agent, or Firm*—Frank H. Foster; Kremblas, Foster, Phillips & Pollick

(57) ABSTRACT

A coolable housing shell for an electric machine, which is produced as a cast part, accommodates a concentric interior rotor/stator arrangement, coils, and end windings, and comprises a clear, open, through passage that is embodied in a symmetric, concentric, and/or coaxial manner relative to an imaginary axis of rotation of the machine. Said housing shell is interspersed with one or several cooling channels so as to form a coolant circuit. The inner surfaces of the shell and the inner walls of the channel/s have a coating via a cathodic dipping varnish method.

11 Claims, 7 Drawing Sheets

U.S. PATENT DOCUMENTS

| | | | |
|---|---|---|---|
| 6,023,838 A * | 2/2000 | Yamakoshi et al. | 29/596 |
| 6,088,314 A * | 7/2000 | Tachibana et al. | 369/53.3 |
| 6,239,518 B1 * | 5/2001 | Matsubara et al. | 310/58 |
| 6,599,351 B1 * | 7/2003 | Rentschler et al. | 106/14.12 |
| 6,663,362 B1 * | 12/2003 | Lentz et al. | 417/423.7 |

FOREIGN PATENT DOCUMENTS

| | | |
|---|---|---|
| JP | 2001-088525 | 3/2001 |
| JP | 2001-092697 | 10/2002 |

* cited by examiner

DIPPING VARNISH-COATED COOLING SHELL OF A HOUSING FOR AN ELECTRIC MACHINE

BACKGROUND OF THE INVENTION

1. Field of the Invention

The invention relates to a coolable housing jacket for an electric motor, which takes the form of a moulded part manufactured by casting. To receive a coaxial or concentric internal rotor/stator arrangement including windings and winding overhang, the housing jacket is formed with a through-passage which is symmetrical, concentric and/or coaxial with respect to a hypothetical motor axis of rotation. Cooling is realised by means of circulation of coolant through one or more cooling channels penetrating the housing jacket.

2. Description of the Related Art

For the prior art, we refer first to DE 199 49 140 A1, DE 199 39 760 A1, DE 199 39 013 A1, DE 196 48 134 A1, DE 196 24 519 A1, DE 42 43 716 A1, DE 39 41 474 A1 and U.S. Pat. No. 5,084,642 A.

A generic electric motor with liquid cooling is described in DE 100 45 424. A housing jacket is formed hollow and is divided into plural channels through which coolant flows. On both sides of the electric motor in the respectively associated end shield is a connecting channel for the supply of cooling liquid from the housing jacket into the end shield. The end shield inner cavities are thus fully filled with cooling liquid, so that the bearings and couplings for pumps to be driven are cooled and simultaneously lubricated. The end shields are manufactured separately from the housing jacket as individual castings. As cooling liquid, hydraulic oil or water are mentioned, from which any impurities are removed by filtering in order to prevent blockage of the channels in the electric motor. However, the problem of corrosion is not addressed, and this is serious in the case of an aluminium housing jacket cooled by water which may become contaminated with dirt and impurities. There is a risk that then the aluminium may oxidise and corrode very rapidly. This then leads to internal rusting of the cooling channels and rust particles can become detached and block the cooling channel system.

Although corrosion protection by cathophoresis dip-varnishing in connection with electric motors is described in DE 43 06 897 A1, it is hinted to subject the stator itself, without factual connection with motor cooling, to a cathophoresis varnishing process, in which a first base coat is applied. Then, compulsorily according to the specification, a second subsequent dipping process is necessary, by means of which a low-viscosity single- or multiple-component varnish resistant to chemical influences is applied as a sealing coat. This is meant to achieve sealing of any pores and gaps remaining by the sealing coat, e.g. those that arise predominantly in corner regions or in the region of the starting copper after the application of the base coat, and hence the oxidation-resistance should be increased and corrosion of the stator and rotor materials should be excluded. Thus corrosion protection should be achieved for electric motors running in water, which act as a drive element for pumps, in particular split-pole motors.

The object of the invention is to increase the service life and reliability of the coolant flow circuit and of the whole cooling system of an electric motor with a coolable housing jacket of the type mentioned in the introduction. To achieve this, the coolable housing jacket indicated in claim 1 is proposed.

Further details and advantageous embodiments of the invention will appear from the dependent claims.

BRIEF SUMMARY OF THE INVENTION

According to the invention therefore at least the inner faces of the housing jacket and in particular the surfaces of the inner walls of the cooling channels worked therein are coated by means of the dip process, in particular a cathodic dip-varnishing process or cathophoresis varnishing for corrosion protection. Such processes are known per se from the motor vehicle industry.

With the invention the advantage can be achieved that cooling liquid or water even of poor quality, in particular containing aggressive impurities, can be used for cooling the in particular cast-iron housing jacket. The dipping varnish applicable by the cited cathodic dip-varnishing process is in particular mechanically very hard and can prevent the cast iron, in particular aluminium, which is sensitive to aggressive cooling water, of the housing jacket from corroding. With the cathodic dip-varnishing process, a coating is achievable which is very resistant even to water containing chemically aggressive impurities.

According to a particular embodiment, for the (electrolytically) deposited dipping varnish, epoxyaminourethane is used as a chemical basis. The cast housing jacket preferably manufactured from aluminium acts as the negatively-poled cathode in the electrolytic coating process. The desired coating thickness, preferably between 10 µm and 50 µm or 15 µm and 40 µm, is in this case set via the level of the dipping bath voltage and the time within which this voltage is applied. Within the scope of the invention, a varnish hardness (Bucholz-hardness according to ISO 2815 (DIN 53153))$\geq 80$ is to be aimed at.

According to an advantageous embodiment of the invention in which the housing jacket has plural housing jacket faces, in particular parallel end faces, the cooling channels are formed on at least a first housing jacket face with apertures which are freely accessible on the outside. Therefore because the cooling channels open freely on to a face of the housing jacket, upon dipping of the jacket into a varnish bath, the electro-dipping varnish can be applied via these cooling channels to the inner faces of the cooling channel system to be coated. Upon completion of the cathodic dipping process, the dipping liquid can escape quite quickly through the free apertures, or the housing jacket can be particularly easily emptied of the dipping liquid running out of these apertures.

The possibility of emptying the dipping varnish is further enhanced if on the opposing, preferably integrally cast-on housing jacket face one or more bores or other perforations are formed. These can also be used to fill the housing jacket with additional cathodic dipping liquid and to drain the said liquid. Advantageously, the bores are provided with female threads so that for the normal cooling long-term operation of the corresponding electric motor or generator, it is easy to assemble a sealing means on the integrally cast end face via sealing screws preferably provided with sealing rings.

Further details, features and advantages on the basis of the invention will appear from the following description of preferred embodiments of the invention and from the drawings, which show:

DETAILED DESCRIPTION OF THE INVENTION

Figure 1:
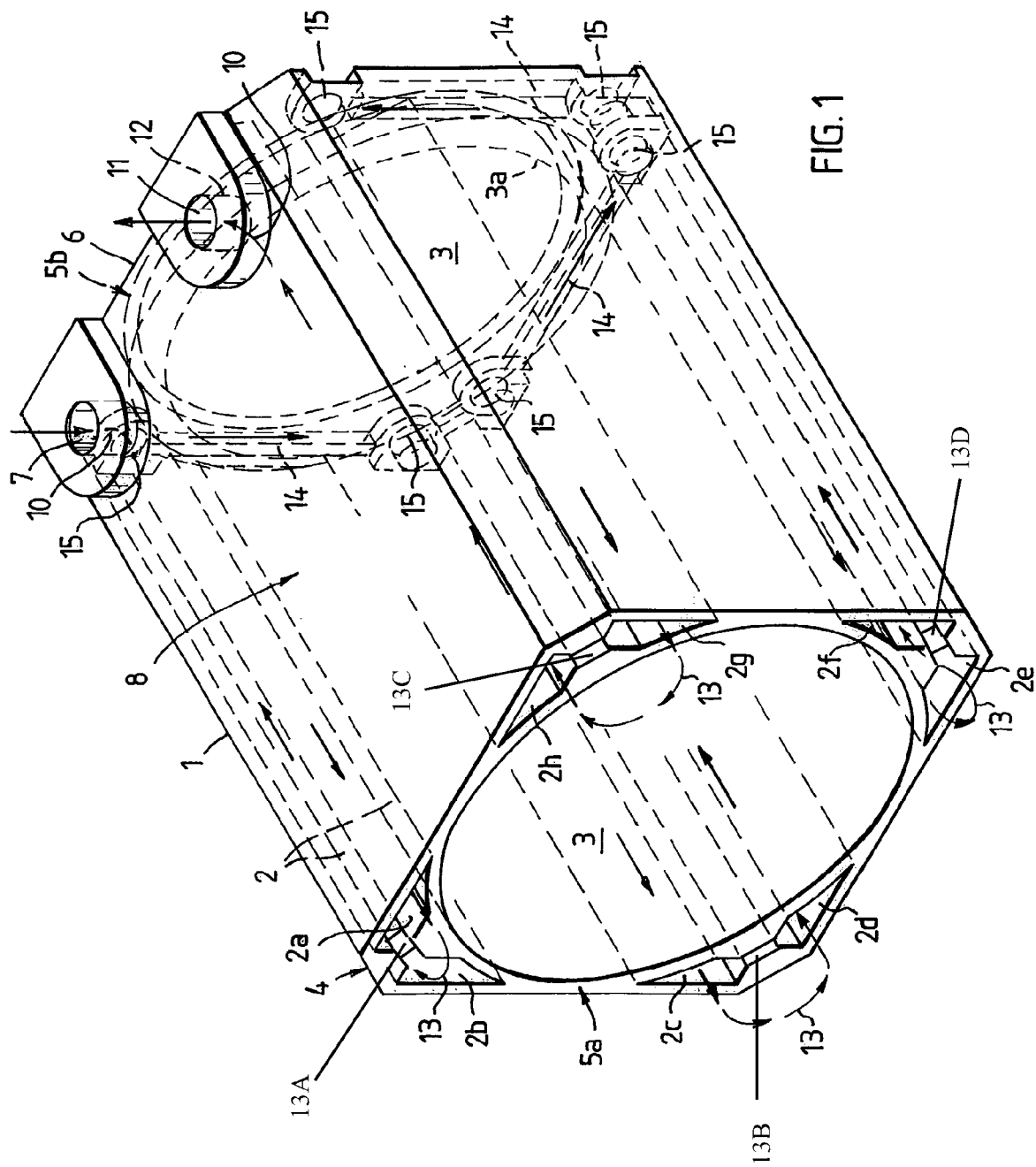
FIG. 1, a perspective view of a cooling housing jacket according to the invention by way of example, FIG. 2, a perspective view of the integrally cast end face of the housing jacket according to the invention in accordance with FIG. 1, which is complemented by screwing on the cover device to the other end face to form the complete cooling housing, FIG. 3, the complete housing according to FIG. 2 in a perspective view of the end face provided with a separate cover device, FIG. 4, in axial section an arrangement of the cooling housing according to the invention with the stator received therein for an electric motor, FIG. 5, the arrangement in plan in the direction V in FIG. 4, FIG. 6, an end view in the direction VI in FIG. 4, FIG. 7, an end view in the direction VII in FIG. 4, FIG. 8, a diagram of the pressure ring acting as a cover device without the stator received and without stator windings, in a radial side view, FIG. 9, an end view in the direction IX in FIG. 8, FIG. 10, an end view in the direction X in FIG. 8, FIG. 11, a plan view in the direction XI in FIG. 9, and FIG. 12, in a perspective diagram an enlarged, truncated detail of the region having the sealing device between the housing jacket end face and the opposing end face of the cover device or pressure ring.
Figure 4:
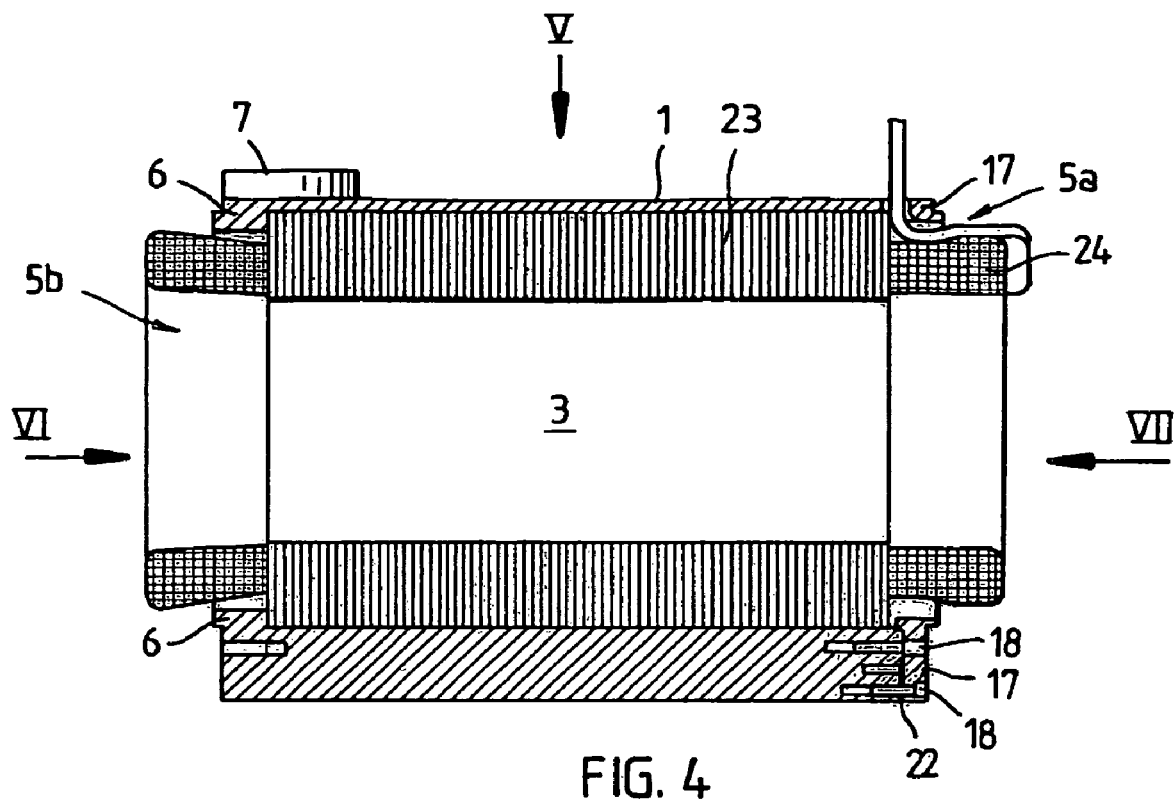
Figure 5:
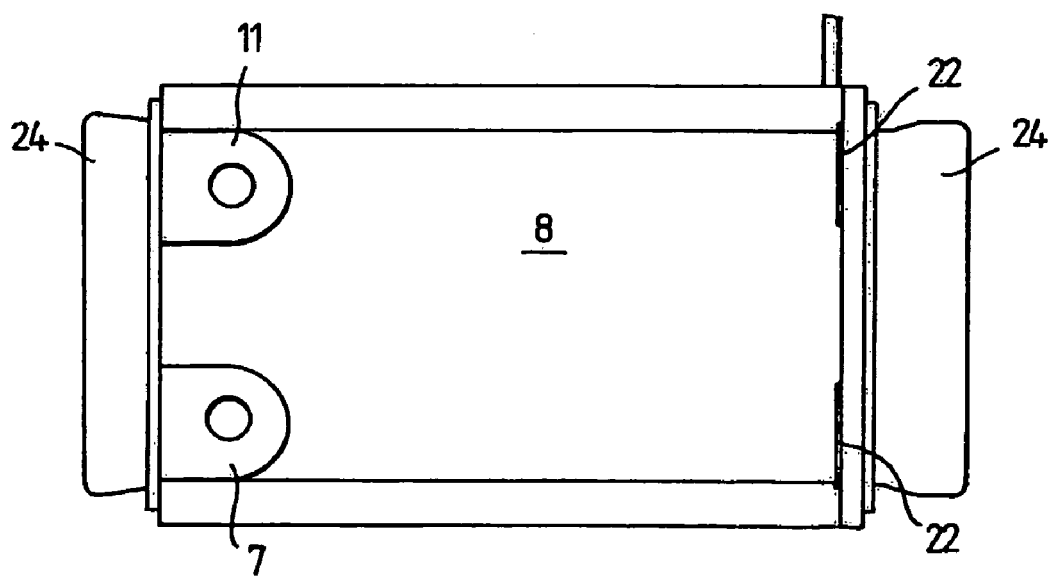

According to FIG. 1, the housing jacket 1 is manufactured as an integral aluminium casting with in all eight axially parallel cooling channels 2. The housing jacket 1 has in its interior a clear passage 3, which is symmetrical with respect to a hypothetical motor axis of rotation and which is used to receive a coaxial or concentric internal rotor/stator arrangement together with windings and winding overhang (as is also shown in FIG. 4). The cooling channels 2 extend parallel to the hypothetical machine axis of rotation (axially parallel) between a recessed contour 3a defining the passage 3 and the axially parallel outer wall 4 of the housing jacket 1. Two cooling channels 2 are provided, extending adjacent to one another, per quadrant of the circular circumference. Their ends are left open and freely accessible at a first housing jacket end face 5a of two parallel end faces 5a, 5b. As can also be deduced from FIG. 2, the cooling channels 2 end at the second end face 5b at a respective cast wall 6 or are cast closed at this point. Consequently, it is not possible for coolant or cooling liquid to escape via the second end face 5b. Coolant can be supplied via an inlet aperture 7 to the end of a first cooling channel 2a lying in the region of the second end face 5b, the inlet aperture 7 being formed on a longitudinal upper face 8 and in a corner region bordering the second end face 5b as an inlet channel 9 extending transverse to the axially parallel direction optionally with a deflecting chamber for deflecting the flow 10 through 90°. Accordingly, on the longitudinal upper face 8 in the opposite corner region, likewise an outlet aperture 11 is formed on the second end face 5b and communicates via a 90°-flow deflection 10 with the last cooling channel 2h ending in the region of the second end face 5b. Corresponding to the inlet channel 9 in the case of the inlet aperture 7, the outlet aperture 11 has an outlet channel 12, likewise penetrating the longitudinal upper face 8, and extending transverse to the axially parallel direction.

To form the closed cooling circuit, 180°-flow deflections 13 must take place at the first end face 5a between the open ends therein of two adjacent cooling channels 2a and 2b, 2c and 2d, 2e and 2f, and 2g and 2h respectively. These flow deflections 13 at the end face 5a flow through flow deflection channels 13A, 13W 13C and 13D. These alternate with 90°-flow deflections 10 respectively on the opposite, second end face 5b within the cast wall 6 integrally cast there (for the sake of clarity, this is only shown in the regions of the inlet/outlet apertures 7, 11). Between the 90°-flow deflections (not shown) which do not take place in the region of an inlet/outlet aperture 7, 11, respective transverse ducts 14 extend within the cast wall at right angles to the cooling channels. The 90°-flow deflections 10 that do occur after the inlet 11 open into one of the transverse ducts respectively. Thus coolant flowing within the cast wall 6 of the second end face 5b can be conveyed from one quadrant of the circumference to the respectively adjacent one. Each transverse duct 14 connects the end of a cooling channel 2 lying in the second end face 5b to the cooling channel end lying likewise in the second end face 5b of an adjacent quadrant of the circumference.

Figure 2:
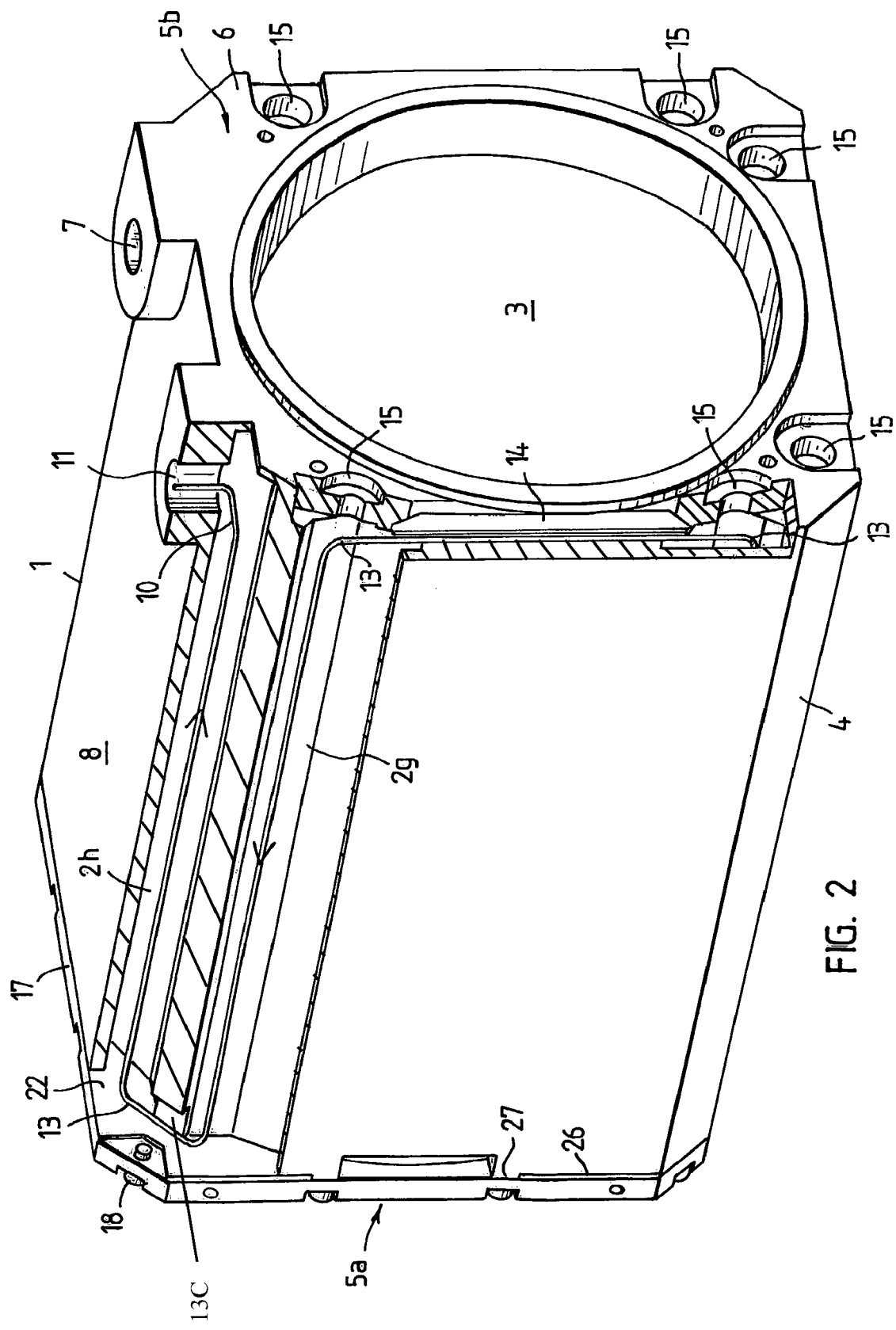
Figure 6:
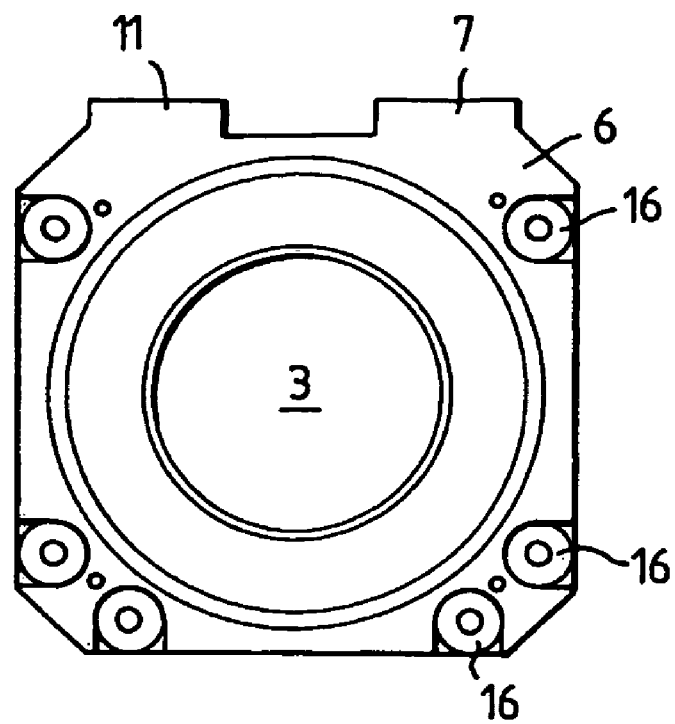
Figure 7:
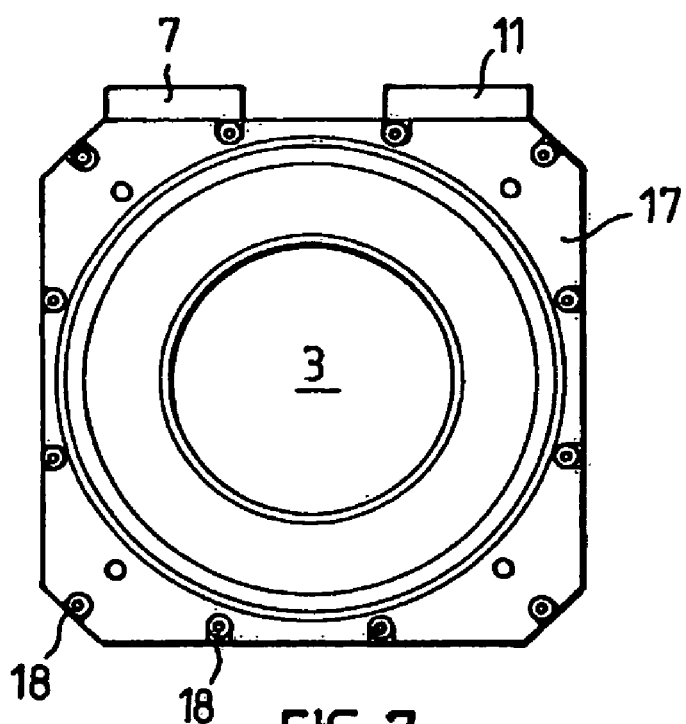
Figure 8:
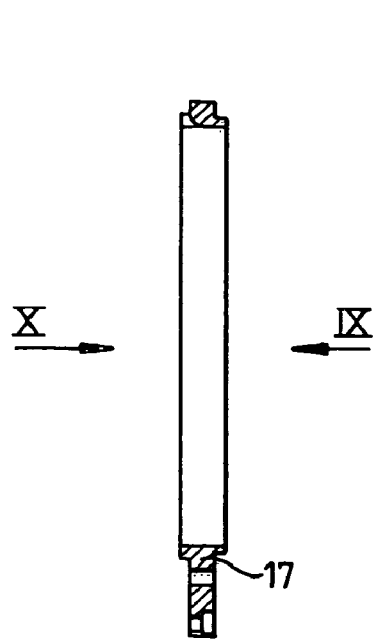

According to FIGS. 1 and 2, assembly and drainage bores 15 are formed in the second end face 5b, communicate respectively with one of the cooling channels 2b-2g or their ends and the transverse ducts 14 communicating therewith (except the first and last cooling channels 2a and 2h respectively in the flow circuit) and penetrate the cast wall 6, thus leading to the exterior. They are advantageously provided with female threads in order to be able to fix holding elements for casting mould cores in the cavities of the housing jacket during the manufacturing and casting process. In addition, the liquid of a dipping varnish bath can run out through the bores 15 if the housing jacket is subjected to corrosion-resistant coating by a dip-varnishing process, in particular of its cavity surfaces (see above). The female threads (not shown) of the bores 15 may also be used to receive and fix sealing screws 16 (cf. FIG. 6) provided with sealing rings in order to seal the circuit of the coolant against the external environment, for example when the motor is in operation. However, the first and last cooling channels 2a and 2h respectively do not communicate with assembly and drainage bores, but as explained with the inlet and outlet apertures 7, 11, through which dipping varnish liquid can drain likewise after the casting process.

Figure 3:
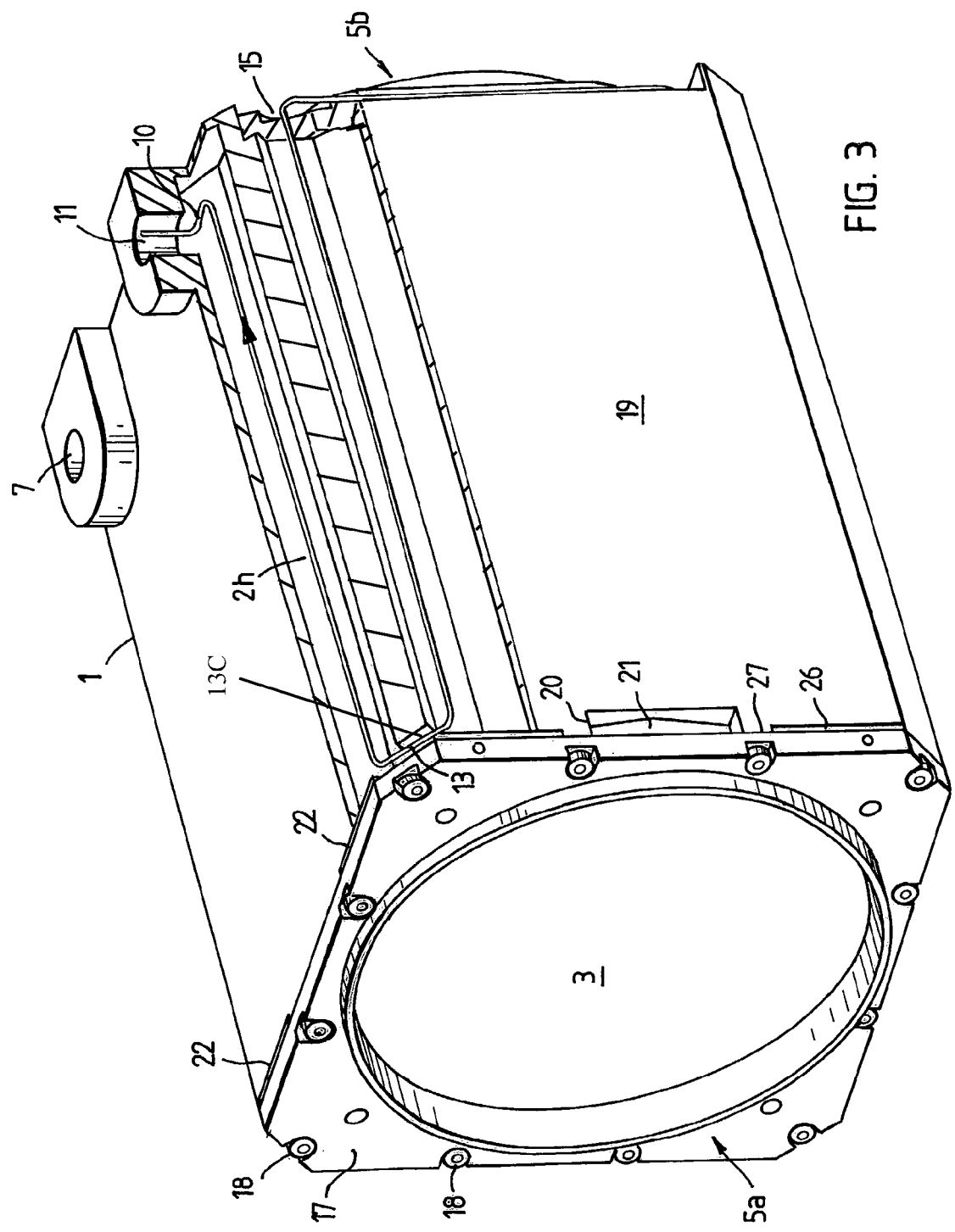
Figure 9:
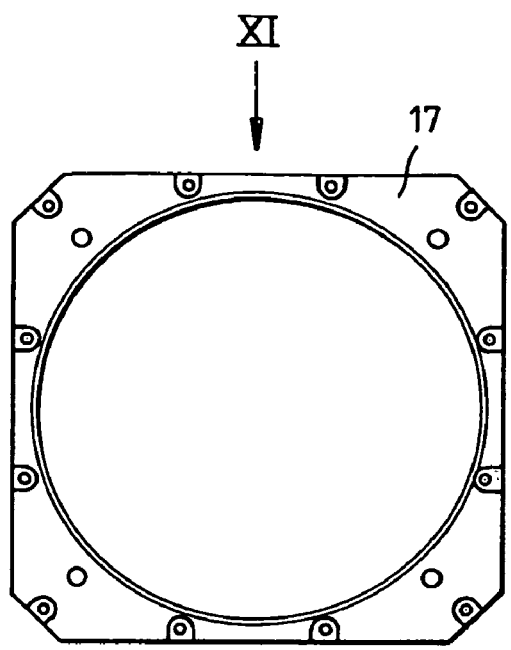
Figure 10:
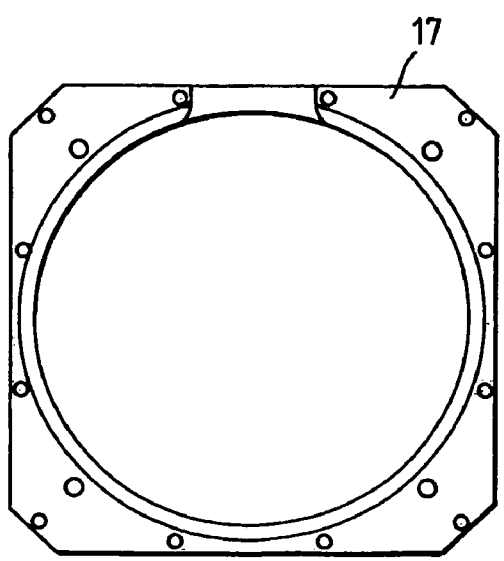
Figure 11:
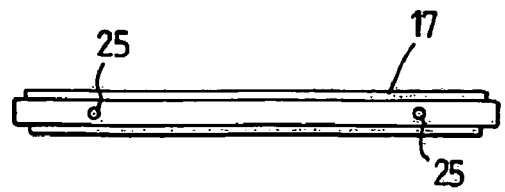

According to FIG. 3, the apertures of the cooling channels 2 located on the first end face 5a are sealed against the outside by a separately formed sealing ring 17 (cf. also FIGS. 9-11). This is fixed by means of a row of fixing screws 18 encompassing the hypothetical axis of rotation to the abutting end wall of the housing jacket 1. An axially parallel side wall 19 of the housing jacket 1 is formed at the first end face 5a with an elongate rectangular recess 20, which together with the opposing pressure ring 17 defines a free aperture 21, which can be used to pass through cable terminals for the windings or the like. These must obviously be sealed against the flow circuit of the coolant. To this end, flat sealing bodes 22 (see also FIG. 12 and the associated comments) are sandwiched between the opposing end walls of the pressure ring 17 and of the housing jacket 1.

FIG. 4 shows that the housing jacket 1 together with the pressure ring 17 fixed thereto coaxially encompasses a stator laminated core 23 or associated winding overhang 24. Details essential to the invention will be immediately recognisable to the practised reader of technical drawings from FIGS. 4-7 without further explanation, especially as corresponding parts have the same reference numbers.

Out of FIGS. 8-11 which shown the pressure ring 17, FIG. 9 shows the pressure ring end face which is remote from the housing jacket according to FIGS. 1-3, whilst FIG. 10 conversely shows the end face which in the mounted state abuts the opposite end wall or first end face 5a of the housing jacket. According to FIG. 11, fixing bores 25 are formed in the upper face of the jacket surface of the pressure ring 17, over which a terminal box or the like can be assembled.

Figure 12:
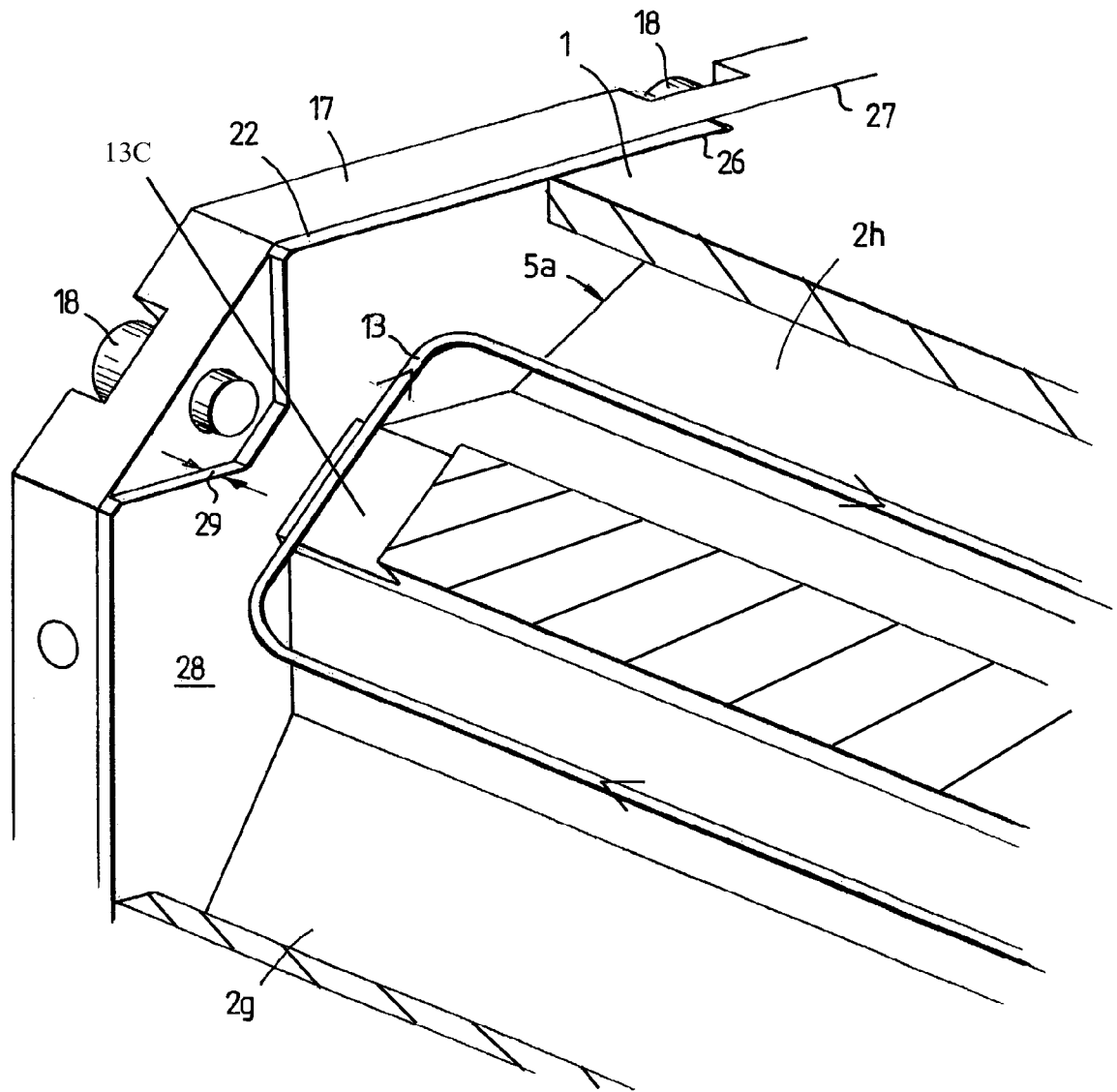

According to FIG. 12, the housing jacket 1 is formed on the first end face on its wall opposite the pressure ring 17 with a receiving dip or recess which may be milled for example. The depth is such that the flat sealing body 22 with a corresponding thickness 29 can find a seat. The purpose of this is that the ends of the two cooling channels 2g, 2h and the 180°-flow deflection 13 connecting the two in a deflection chamber 29 are sealed against the rest of the environment. The flat sealing body 22 forms a sealing wall 22 as it were for the deflection chamber 28gh. In this case it is within the scope of the invention slightly to pinch the flat sealing bodies 22 or to compress then between the pressure ring 17 and the opposing end wall of the housing jacket 1. To this end, the flat sealing bodies or sealing walls 22 extend beyond the deflection chambers 28gh into the peripheral region between the mutually associated end walls of the pressure ring 17 and of the housing jacket 1. However, the compression need only be slight, because the butt joint 27 immediately following the receiving recess 26 in the transverse direction is formed by the mutual abutment of the respective metal wall faces of the pressure ring 17 and of the housing jacket 1. By means of the fixing screws 18, the sealing mutual abutment of the metal faces in the region of the butt joint 27 can be effected with a high level of contact pressure without unduly compressing the flat sealing bodies 22 and impairing their mechanical properties. This is because they have sufficient space in the receiving recess 26. On the other hand, the screwing of the sealing ring 17 to the opposing wall of the housing jacket 1 creates "block-on-block" strength and stability. From FIGS. 2, 3, 5 and 12, it can be deduced that in the example shown four receiving recesses 26 each holding one sealing wall 2 with four butt joints 27 alternate along a row surrounding the hypothetical motor axis of rotation. From FIG. 12 it can also be seen that the two cooling channels 2g, 2h there end at the first end face 5a in the common deflection chamber 28gh, which is defined and sealed like a wall by the flat sealing body 22.

LIST OF REFERENCE NUMBERS 1 housing jacket
2, 2a-2h cooling channels
3 through-passage
4 wall
5a first end face
5b second end face
6 cast end wall
2a first cooling channel
7 inlet aperture
2h last cooling channel
8 longitudinal upper face
9 inlet channel
10 90°-flow deflection
11 outlet aperture
12 outlet channel
13 180°-flow deflection
14 transverse duct
15 assembly and drainage bore
16 sealing screw
17 pressure ring
18 fixing screws
19 longitudinal face
20 recess
21 aperture
22 flat sealing body or sealing wall
23 stator laminated core
24 winding overhang
25 fixing bore
26 receiving recess
27 butt joint
28gh deflection chamber
29 thickness

The invention claimed is:

1. A coolable housing jacket (1) for an electric motor, which is manufactured as a cast moulded part, is formed for receiving a concentric internal rotor/stator arrangement (23) together with windings and winding overhang (24) with a through-passage (3) that is symmetrical, concentric and/or coaxial with respect to a hypothetical motor axis of rotation, and which is penetrated by one or more cooling channels (2, 2a-h) to form a coolant circuit, characterised by
 (a) a coating on the jacket inner faces including the channel internal walls via a cathodic dip-varnishing process and
 (b) the housing jacket being an integral, one piece casting within which are the cooling channels (2) and transverse ducts (14) connecting the ends of cooling channels of adjacent quadrants wherein the cooling channels (2) end with apertures freely accessible on the outside opening onto at least a first (5a) of plural housing jacket end faces (5a, 5b), and wherein in a second (5b) of the housing jacket end faces (5a, 5b) the cooling channels (2) end at a housing wall formed by the one piece casting and are thus closed in a sealing-tight manner with respect to the outside and wherein the housing jacket end face (6) formed by casting and sealing the cooling channels (2) has in its cast wall one or more bores (15) or perforations.

2. A housing jacket according to claim 1, characterised in that the coating thickness is between 10 μm and 50 μm.

3. A housing jacket according to claim 1, characterised by the use of a dipping varnish with a basis of epoxyaminourethane deposited by a cathophoretic process.

4. A housing jacket according to claim 1, characterised by the manufacture of the jacket body from aluminium.

5. A housing jacket according to claim 1, characterised in that the housing jacket end faces (5a, 5b) comprise two end faces which are remote from one another and/or parallel to one another, the cooling channels (2) in the first (5a) of which end freely accessibly on the exterior, and the cooling channels (2) in the second (5b) of which end at a housing end wall (6) formed by casting and are thus closed in a sealing-tight manner to the exterior.

6. A housing jacket according to claim 1, characterised in that the second (5b) housing jacket end face (6) or end wall formed by casting abuts the remaining housing jacket body in an integral manner.

7. A housing jacket according to claim 5, characterised in that the second (5b) housing end wall (6) formed by casting is provided inside with cavities such that they form deflection chambers and/or transverse ducts (14), which communicate with the cooling channels (2), extend transverse to a hypothetical motor axis of rotation, and join together the channel ends and/or the deflection chambers.

8. A housing jacket according to claim 1, characterised in that the bores or perforations have a female thread for the fixing of casting core holding elements and/or for receiving screw-type seals (16).

9. A housing jacket according to claim 8, characterised in that the screw-type seals (16) are provided with sealing rings.

10. A housing jacket according to claim 1, characterised in that the bores (15) or perforations are formed as inlets or outlets (7, 11) for coolant and communicate with the cooling channels, optionally via a deflection chamber and/or transverse duct (14).

11. A housing jacket according to claim 1, characterised in that at least on a first housing jacket end face (5a) fixing elements (18), are provided in order to mount a cover, an end shield or pressure ring (17).

* * * * *

UNITED STATES PATENT AND TRADEMARK OFFICE
CERTIFICATE OF CORRECTION

PATENT NO. : 7,576,458 B2  Page 1 of 1
APPLICATION NO. : 10/531131
DATED : August 18, 2009
INVENTOR(S) : Wehner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 718 days.

Signed and Sealed this

Seventh Day of September, 2010

David J. Kappos
*Director of the United States Patent and Trademark Office*